United States Patent
Song et al.

(10) Patent No.: US 8,879,799 B2
(45) Date of Patent: Nov. 4, 2014

(54) HUMAN IDENTIFICATION SYSTEM BY FUSION OF FACE RECOGNITION AND SPEAKER RECOGNITION, METHOD AND SERVICE ROBOT THEREOF

(71) Applicant: National Chiao Tung University, Hsinchu (TW)

(72) Inventors: Kai-Tai Song, Hsinchu (TW); Shuo-Cheng Chien, Hualien County (TW); Chao-Yu Lin, Taipei (TW); Yi-Wen Chen, Taoyuan County (TW); Sin-Horng Chen, Hsinchu (TW); Chen-Yu Chiang, Hsinchu County (TW); Yi-Chiao Wu, New Taipei (TW)

(73) Assignee: National Chiao Tung University, Hsinchu (TW)

( * ) Notice: Subject to any disclaimer, the term of this patent is extended or adjusted under 35 U.S.C. 154(b) by 120 days.

(21) Appl. No.: 13/675,590

(22) Filed: Nov. 13, 2012

(65) Prior Publication Data

US 2014/0016835 A1 Jan. 16, 2014

(30) Foreign Application Priority Data

Jul. 13, 2012 (TW) .............................. 101125278 A

(51) Int. Cl.
*G06K 9/00* (2006.01)
*G10L 17/00* (2013.01)
*G10L 17/06* (2013.01)

(52) U.S. Cl.
CPC ............ *G06K 9/00221* (2013.01); *G10L 17/00* (2013.01); *G10L 17/06* (2013.01); *G06K 9/00892* (2013.01)
USPC ........................... 382/115; 382/118; 382/116

(58) Field of Classification Search
CPC ............ G06K 9/00892; G06K 9/0021; G06K 9/00228; G06K 9/00885; G06K 9/00221; H04N 21/4415; G10I 17/10; G10I 17/00; G10I 17/005
USPC .......................................... 382/115, 118, 124
See application file for complete search history.

(56) References Cited

U.S. PATENT DOCUMENTS

| 6,567,775 B1 * | 5/2003 | Maali et al. ................... 704/231 |
| 2005/0027530 A1 | 2/2005 | Fu et al. |
| 2013/0279744 A1 * | 10/2013 | Ingrassia et al. .............. 382/103 |

* cited by examiner

*Primary Examiner* — Edward Park
(74) *Attorney, Agent, or Firm* — Muncy, Geissler, Olds & Lowe, P.C.

(57) ABSTRACT

The present invention discloses a human identification system by fusion of face recognition and speaker recognition, a method and a service robot thereof. The system fuses results of the face recognition and the speaker recognition, and further uses confidence index to estimate the confidence level of the two recognition results. If only one of the confidence indices of the two recognition results reaches the threshold, then only this result is used as the output. If both confidence indices of the two recognition results reach the threshold, then the two recognition results are fused to output as a final result.

18 Claims, 6 Drawing Sheets

HUMAN IDENTIFICATION SYSTEM BY FUSION OF FACE RECOGNITION AND SPEAKER RECOGNITION, METHOD AND SERVICE ROBOT THEREOF

CROSS-REFERENCE TO RELATED APPLICATION

This application claims the benefit of Taiwan Patent Application No. 101125278, filed on Jul. 13, 2012, in the Taiwan Intellectual Property Office the disclosure of which is incorporated herein by reference.

FIELD OF THE INVENTION

The present invention relates to a human identification system, in particular to the human identification system that integrates face recognition and speaker recognition and calculates the confidence level of the two to enhance the robustness of the system.

BACKGROUND OF THE INVENTION

As science and technology advance, we have increasingly higher demand on the quality of life, so that various products facilitating our life are developed and introduced constantly. Wherein, the demand for service robots increases year by year and the service robots can help us working in difficult environments, act as a robot for healthcare and medical treatment, or a mobile household robot for recreation and family affairs service. Human identification technology is the key technology of the service robot. On the other hand, the human identification technology is also used extensively in security systems.

However, the conventional human identification system still has many drawbacks remained to be overcome. For example, a human identification system as disclosed in U.S. Pat. No. 6,567,775 uses all images and sounds in a video for face recognition and speaker recognition and finally performs a fusion calculation. Although this method adopts both face recognition and speaker recognition at the same time to improve the recognition accuracy, the system uses the video as input, so that instantaneousness can not be achieved. In addition, this system has no evaluation on the confidence level of the face recognition and the speaker recognition, and misjudgments will occur easily in complicated environments.

Further, a human identification system as disclosed in U.S. Pat. Application No. 2005/0027530 uses a hidden Markov model (HMM) to fuse face recognition and speaker recognition. Although this system also integrates face recognition and speaker recognition and uses a special mechanism to improve the recognition accuracy, yet the system still has no evaluation on the confidence level of the face recognition and the speaker recognition, so that the system cannot function if any one of the recognitions is not operated normally.

In addition, most conventional human identification systems can only be applied at a fixed location, and they require a predetermined working environment, so that a too-large error will not occur during the recognition. However, if the working environment changes such as in an application of a service robot, the service robot is not set at a fixed location, but it moves around instead. Therefore, the working environment including the conditions of light and noise will be changed, and the conventional human identification systems may have misjudgments or failures on identifications.

Therefore, it is a main subject for the present invention to provide a human identification system not only featuring instantaneousness, but also improving the human recognition accuracy in a complicated varying environment.

SUMMARY OF THE INVENTION

In view of the shortcomings of the prior art, it is a primary objective of the present invention to provide a human identification system by fusion of face recognition and speaker recognition to overcome the problem of the conventional human identification systems having misjudgments easily in a poor working environment.

To achieve the foregoing objective, the present invention provides a human identification system by fusion of face recognition and speaker recognition, comprising a face recognition module, a speaker recognition module, a confidence index calculating module and a processing module. The face recognition module is provided for capturing an image, and executing face detection of the image to generate a face image, and then executing face recognition of the face image to obtain a plurality of face recognition scores corresponding to a plurality of predetermined members respectively. The speaker recognition module is provided for capturing sound data, and detecting a voice in the sound data to generate voice data, and then executing speaker recognition of the voice data to obtain a plurality of speaker recognition scores corresponding to the plurality of members respectively. The confidence index calculating module is provided for calculating a confidence level of the face recognition and a confidence level of the speaker recognition to produce a face recognition confidence index and a speaker recognition confidence index. The processing module is provided for generating a human identification result according to the plurality of face recognition scores, the face recognition confidence index, the plurality of speaker recognition scores and the speaker recognition confidence index.

To achieve the foregoing objective, the present invention further provides a human identification method by fusion of face recognition and speaker recognition, and the method comprises the steps of using a face recognition module to capture an image and execute face detection of the image to generate a face image, and then execute face recognition of the face image to obtain a plurality of face recognition scores of a plurality of predetermined members; using a speaker recognition module to capture sound data and detect a voice in the sound data to generate voice data, and then execute speaker recognition of the voice data to obtain a plurality of speaker recognition scores corresponding to the plurality of members respectively; using a confidence index calculating module to calculate a confidence level of the face recognition and a confidence level of the speaker recognition to generate a face recognition confidence index and a speaker recognition confidence index; and using a processing module to generate a human identification result according to the plurality of face recognition scores, the face recognition confidence index, the plurality of speaker recognition scores and the speaker recognition confidence index.

Preferably, the processing module generates the human identification result according to the plurality of face recognition score, if the face recognition confidence index exceeds a predetermined threshold and the speaker recognition confidence index does not exceed the predetermined threshold.

Preferably, the processing module generates the human identification result according to the plurality of speaker recognition scores, if the speaker recognition confidence index exceeds the predetermined threshold and the face recognition confidence index does not exceed the predetermined threshold.

Preferably, the processing module determines that the human identification result is unidentifiable, if none of the face recognition confidence index and the speaker recognition confidence index exceed the predetermined threshold.

Preferably, the processing module performs a fusion calculation to generate the human identification result according to the plurality of face recognition scores, the face recognition confidence index, the plurality of speaker recognition scores and the speaker recognition confidence index, if both of the face recognition confidence index and the speaker recognition confidence index exceed the predetermined threshold.

Preferably, the fusion calculation generates a final face recognition score by multiplying the face recognition score of each of the members by the face recognition confidence index through the processing module, generates a final speaker recognition score by multiplying the speaker recognition score of each of the members by the speaker recognition confidence index, adds the final face recognition score and the corresponding final speaker recognition score to generate a human recognition score corresponding to each of the members, and generates the human identification result according to the human recognition score.

Preferably, the confidence index calculating module calculates the face recognition confidence index according to a brightness factor and a recognition score difference factor.

Preferably, the brightness factor satisfies the equation:

$$C1 = \begin{cases} (G^{avg})^2, & G^{avg} < T^{low} \\ (1 - G^{avg})^2, & G^{avg} > T^{high} \\ 1, & T^{low} \leq G^{avg} \leq T^{high}; \end{cases}$$

wherein, C1 is the brightness factor, $T^{high}$ is a maximum threshold of a normal brightness of a gray scale value of the image after being normalized to a range of 0~1, $T^{low}$ is a minimum threshold of a normal brightness of a gray scale value of the image after being normalized to a range of 0~1, and $G^{avg}$ is a average value of the gray scale values of the image after being normalized to a range of 0~1.

Preferably, the recognition score difference factor satisfies the equation:

$$C2 = \begin{cases} (Y^{1st} - Y^{2nd})/T, & Y^{1st} - Y^{2nd} < T \\ 1, & Y^{1st} - Y^{2nd} \geq T; \end{cases}$$

and the face recognition confidence index satisfies the equation:

$$C = C1 \times C2$$

wherein, C2 is the recognition score difference factor, T is the difference threshold between the highest score and the second highest score of the plurality of face recognition scores, $Y^{1st}$ is the highest score of the plurality of face recognition scores, $Y^{2nd}$ is the second highest score of the plurality of face recognition scores, and C is the face recognition confidence index.

Preferably, the confidence index calculating module calculates the speaker recognition confidence index according to a confidence index curve, and the confidence index curve satisfies the equation:

$$y = F_R(x) - (1 - F_E(x));$$

wherein, $F_R(x)$ is a cumulative distribution function of a recognition accuracy score obtained from a prior training, $F_E(x)$ is a cumulative distribution function of a recognition error score obtained from a prior training, the x-axis of a confidence index curve represents the speaker recognition score after being normalized to 0~1, and the y-axis of the confidence index curve represents the speaker recognition confidence index after being normalized to 0~1.

To achieve the foregoing objective, the present invention further provides a service robot. The robot comprises a power supply and a human identification system by fusion of face recognition and speaker recognition. The service robot can use the human identification system by fusion of face recognition and speaker recognition to identify a user's identity to determine a user's access authority, and the human identification system by fusion of face recognition and speaker recognition is as described above.

In summation, the human identification system by fusion of face recognition and speaker recognition, the method and the service robot thereof have one or more of the following advantages:

(1) The present invention can use instant information for human identification, and thus featuring instantaneousness.

(2) The present invention integrates face recognition and speaker recognition to improve the recognition accuracy effectively.

(3) The present invention can evaluate the confidence level of the face recognition and the speaker recognition to provide accurate identifications in complicated environments.

DESCRIPTION OF THE EMBODIMENTS

Figure 1:
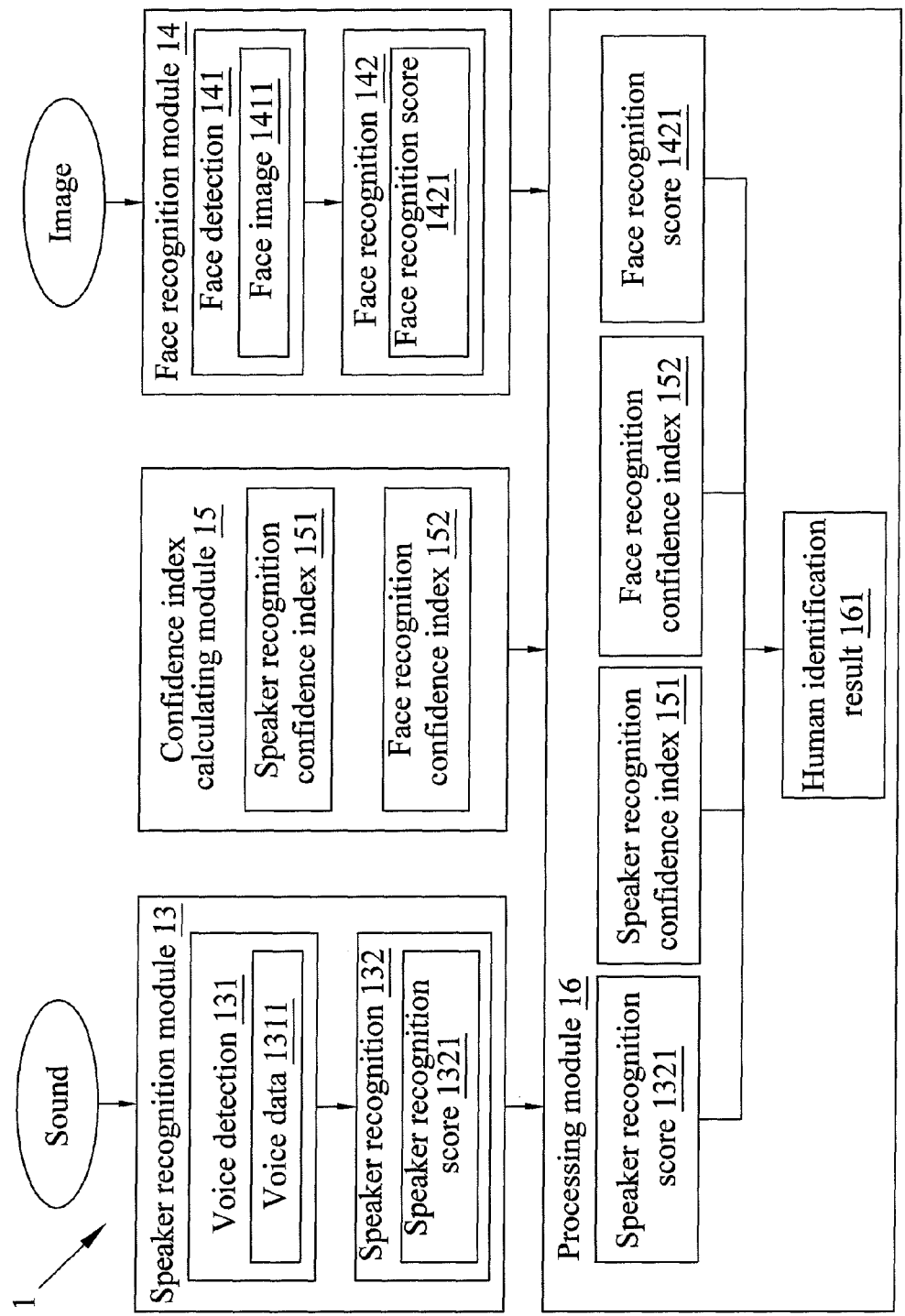
FIG. 1 is a block diagram of a human identification system by fusion of face recognition and speaker recognition in accordance with the present invention.

The technical characteristics of the present invention will become apparent with the detailed description of the preferred embodiments accompanied with the illustration of related drawings as follows. It is noteworthy that same numerals are used for representing the same respective elements in the drawings, and the drawings are provided for the purpose of illustrating the invention, but not intended for limiting the scope of the invention.

With reference to FIG. 1 for a block diagram of a human identification system by fusion of face recognition and speaker recognition in accordance with the present invention, the human identification system 1 comprises a speaker recognition module 13, a face recognition module 14, a confidence index calculating module 15 and a processing module 16.

The speaker recognition module 13 captures sound data, and executes voice detection 131 to collect a voice in the sound data to generate voice data 1311. Now, the speaker recognition module 13 further uses a voice sample of a plurality of predetermined members stored in a database (not shown in the figure) to execute speaker recognition 132 of the voice data 1311 to generate a speaker recognition score 1321 of each corresponding member.

Similarly, the face recognition module 14 captures an image and executes face detection 141 of the image to generate a face image 1411. Now, the face recognition module 14 further uses a face sample of a plurality of predetermined members stored in a database (not shown in the figure) to execute face recognition 142 of the face image 1411 to generate a face recognition score 1421 of each corresponding member.

The confidence index calculating module 15 calculates the confidence level of the face recognition 142 and the speaker recognition 132 to generate a face recognition confidence index 152 and a speaker recognition confidence index 151 according to the environment and other factors of the face recognition 142 and the speaker recognition 132. The processing module 16 generates a human identification result 161 according to the speaker recognition score 1321 of each member, the speaker recognition confidence index 151, the face recognition score 1421 of each member and the face recognition confidence index 152.

The external environment has severe influence on the confidence level of the face recognition 142 and the speaker recognition 132. For example, the brightness of the environment affects the accuracy of face recognition 142, so that when the confidence index calculating module 15 detects a too-dark environment, a lower face recognition confidence index 152 will be generated. If the face recognition confidence index 152 is lower than a predetermined threshold, the processing module 16 will not adopt the recognition result of the face recognition module 14.

Similarly, if the environment is too noisy, the confidence level of the speaker recognition 132 will be dropped, so that when the confidence index calculating module 15 detects a too-noisy environment, a lower speaker recognition confidence index 151 will be generated. If the speaker recognition confidence index 151 is lower than a predetermined threshold, the processing module 16 will not adopt the recognition result of the speaker recognition module 13.

If both of the face recognition confidence index 152 and the speaker recognition confidence index 151 exceed a predetermined threshold, the face recognition 142 and the speaker recognition 132 will have a specific confidence level. Now, the processing module 16 can adopt both of the recognition result of the speaker recognition module 13 and the recognition result of the face recognition module 14 for the fusion calculation to generate a human identification result 161.

It is noteworthy that although the conventional human identification system has integrated the speaker recognition and the face recognition and used both recognition results for the fusion calculation to improve the recognition accuracy, yet the conventional human identification system cannot determine the confidence level of the speaker recognition and the face recognition, so that when one of the speaker recognition and the face recognition is in a poor working environment or both recognitions are situated in a poor working environment, the recognition accuracy of the recognition result cannot be improved effectively.

For example, if the environment is very noisy, the speaker recognition result has no reference value at all, so that when the recognition result by fusion of speaker recognition and face recognition is used, the recognition accuracy will drop. On the other hand, the present invention provides a mechanism for the confidence index, so that if the working environment is poor, the confidence index will drop, and the confidence index will not be adopted when it drops below a predetermined threshold. Therefore, the present invention can reduce the influence caused by the environment effectively and can improve the robustness of the human identification system.

The change of environment will be taken into consideration for the application on service robots. Due to a change of light, backlight, shadow or sound direction and intensity caused by the movement of the robot, the recognition error will cause serious discrepancy or even adverse effects for the service robot of the customized designs.

Figure 2:
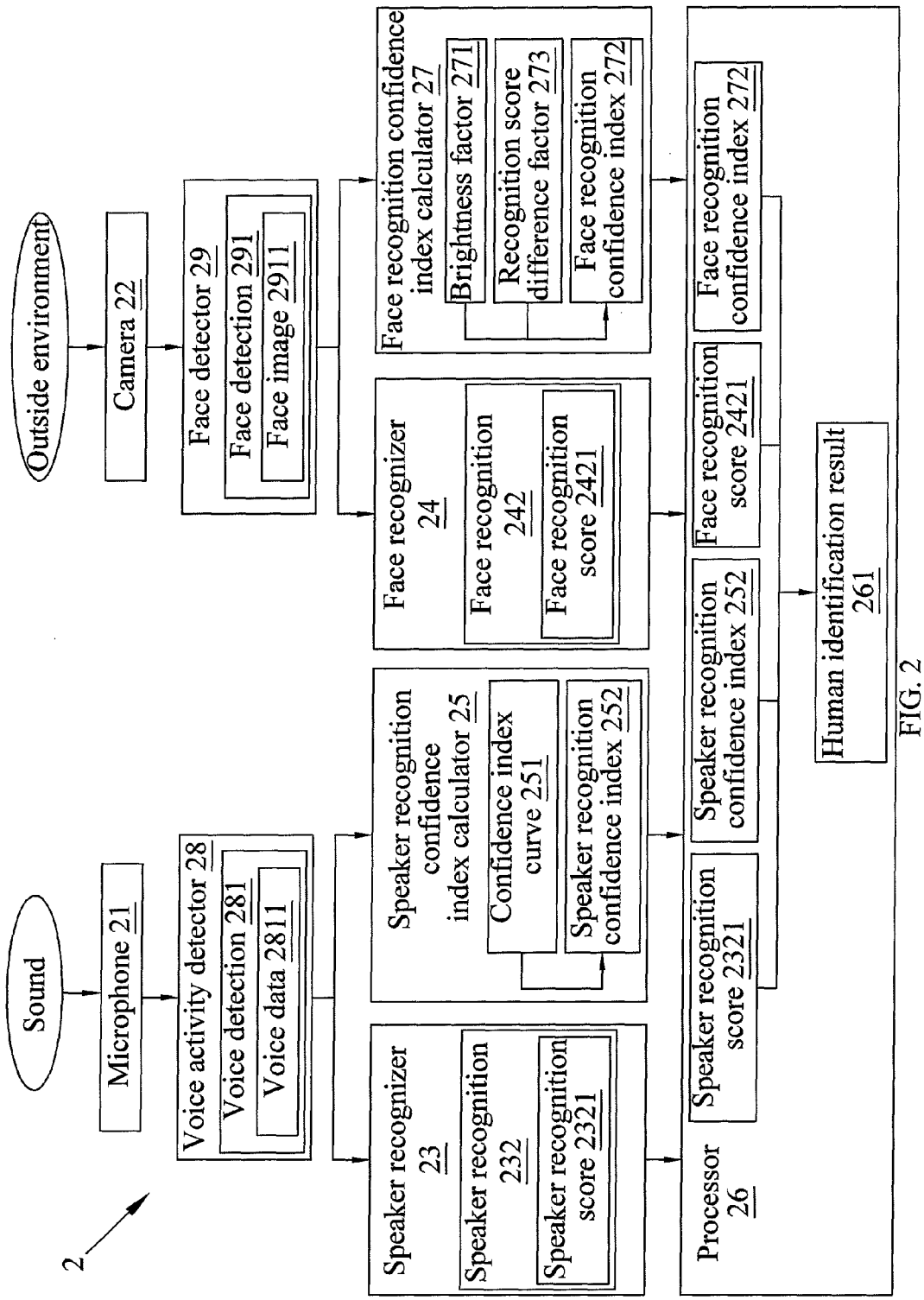
FIG. 2 is a block diagram of a human identification system by fusion of face recognition and speaker recognition in accordance with a first embodiment of the present invention.

With reference to FIG. 2 for a block diagram of a human identification system by fusion of face recognition and speaker recognition in accordance with the first embodiment of the present invention, the human identification system 2 comprises a microphone 21, a voice activity detector 28, a speaker recognizer 23, a speaker recognition confidence index calculator 25, a camera 22, a face detector 29, a face recognizer 24, a face recognition confidence index calculator 27, and a processor 26. The human identification system 2 captures sound data by the microphone 21. The voice activity detector (VAD) 28 receives the sound data and executes voice detection 281 to collect voice data 2811 from the sound data. The speaker recognizer 23 uses a voice sample of a plurality of predetermined members stored in a database (not shown in the figure) to execute speaker recognition 232 of the voice data 2811 to generate a speaker recognition score 2321 of each corresponding member. The speaker recognition confidence index calculator 25 generates a speaker recognition confidence index 252 according to obtains a confidence index curve 251 obtained from a prior training.

In the calculation of the speaker recognition confidence index, a large number of experiment results obtained from the prior training are used to obtain a cumulative distribution function of the recognition accuracy score and a cumulative distribution function of the recognition error score, and the two results are used for obtaining the confidence index curve 251. The confidence index curve 251 can be calculated by the following equation:

$$y = F_R(x) - (1 - F_E(x))$$

Wherein, $F_R(x)$ is the cumulative distribution function of a recognition accuracy score obtained from a prior training, $F_E(x)$ is the cumulative distribution function of an recognition error score obtained from a prior training, the x-axis of a confidence index curve 251 represents the speaker recognition score 2321 after being normalized to 0~1, and the y-axis of the confidence index curve represents the speaker recognition confidence index 252 after being normalized to 0~4. After the speaker recognition score 2321 of each member is obtained, the speaker recognition confidence index calculator 25 can generate the corresponding speaker recognition confidence index 252 according to the confidence index curve 251 to estimate the confidence level of the speaker recognition 232.

Similarly, the human identification system 2 captures an image by the camera 22. The face detector 29 executes face detection 291 of the image to generate a face image 2911. The face recognizer 24 further uses a face sample of a plurality of predetermined members stored in a database (not shown in the figure) to execute face recognition 242 of the face image 2911 to generate a face recognition score 2421 of each corresponding member.

Wherein, the image is pre-processed to reduce the difference of illumination, size and face rotating angle of the image in the process of executing the face recognition 242, so that a standard image form can be obtained after the adjustment of normalization. As to the algorithm, the principal component analysis (PCA) is used to minimize the data dimensions of a face image in order to reduce the volume of data to be calculated. Finally, a radial basis function (RBF) neural network is used to recognize the face. The result outputted from the RBF neural network will be normalized to 0~1, which is the recognition score of the inputted image corresponding to each member of the database. The greater the similarity between the inputted image and each member stored in the database, the higher is the score. The calculated recognition score can be used for the confidence index calculation. The face recognition confidence index calculator 27 calculates a face recognition confidence index 272 according to a brightness factor 271 and a recognition score difference factor 273.

The brightness factor 271 can be calculated by the following equation:

$$C1 = \begin{cases} (G^{avg})^2, & G^{avg} < T^{low} \\ (1 - G^{avg})^2, & G^{avg} > T^{high} \\ 1, & T^{low} \leq G^{avg} \leq T^{high} \end{cases}$$

Wherein, C1 is the brightness factor 271, $T^{high}$ is the maximum threshold (such as 0.6) of a normal brightness of a gray scale value of the image after being normalized to a range of 0~1, $T^{low}$ is the minimum threshold (such as 0.4) of a normal brightness of a gray scale value of the image after being normalized to a range of 0~1, and $G^{avg}$ is the average value of the gray scale values of the image after being normalized to a range of 0~1.

The recognition score difference factor 273 can be calculated by the following equation:

$$C2 = \begin{cases} (Y^{1st} - Y^{2nd})/T, & Y^{1st} - Y^{2nd} < T \\ 1, & Y^{1st} - Y^{2nd} \geq T \end{cases}$$

Wherein, C2 is the recognition score difference factor 273, T is the difference threshold between the highest score and the second highest score of the plurality of face recognition scores 2421, $Y^{1st}$ is the highest score of the plurality of face recognition scores 2421, and $Y^{2nd}$ is the second highest score of the plurality of face recognition scores 2421. In other words, the greater the difference of the face recognition score 2421 of each member, the higher is the confidence level of the face recognition 242. On the other hand, the smaller the difference of the face recognition score 2421 of each member, the lower is the confidence level of the face recognition 242.

Therefore, the face recognition confidence index 272 can be calculated by the following equation:

$C = C1 \times C2$;

Wherein, C is the face recognition confidence index 272. After the face recognition score 2421 of each member is obtained, the face recognition confidence index calculator 27 can generate the face recognition confidence index 272 according to a brightness factor 271 and a recognition score difference factor 273 to estimate the confidence level of the face recognition 242. Of course, the foregoing is provided as an example for illustrating the present invention. The face recognition confidence index calculator 27 and the speaker recognition confidence index calculator 25 can determine the face recognition confidence index 272 and the speaker recognition confidence index 252 according to other factors to estimate the confidence level of the two.

The processor 26 compares the confidence index with the threshold for the obtained face recognition confidence index 272, the face recognition score 2421 of each member, the speaker recognition confidence index 252, and the speaker recognition score 2321 of each member, and the results can be divided into the following three types:

(1) One of the confidence indexes exceeds the threshold.
(2) Both confidence indexes exceed the threshold.
(3) None of the confidence indexes exceed the threshold.

If only one of the face recognition confidence index 272 and the speaker recognition confidence index 252 has a confidence index exceeding the threshold, it shows that one of the working environments is poor, and its result has no reference value, so that the processor 26 only adopts the result exceeding the threshold as the human identification result 261. If both confidence indexes are below the threshold, it shows that both working environments are poor, and the results have no reference value, so that the processor 26 will determine that the identification is unidentifiable and output no recognition result.

If both confidence indexes exceed the threshold, it shows that both results have reference values, so that the processor 26 will perform a fusion calculation to multiply the face recognition score 2421 of each member by the face recognition confidence index 272, multiply the speaker recognition score of each member 2321 by the speaker recognition confidence index 252, and add the two results. Each of the members of each database has its own face recognition score 2421 and speaker recognition score 2321, and these two recognition scores are multiplied by the corresponding confidence indexes and then the products are added to obtain the recognition score. If the final recognition score is obtained, the highest score is selected as the final human identification result 261. Table 1 provides an example of the fusion calculation.

TABLE 1

An Example of Fusion of Face Recognition and Speaker Recognition

| | Confidence Index | A | A* | B | B* | C | C* | D | D* |
|---|---|---|---|---|---|---|---|---|---|
| Face Recognition | 0.8 | 0.30 | 0.240 | 0.45 | 0.360 | 0.20 | 0.160 | 0.05 | 0.040 |
| Speaker Recognition | 0.9 | 0.40 | 0.360 | 0.50 | 0.450 | 0.01 | 0.009 | 0.09 | 0.081 |
| Sum | | | 0.600 | | 0.810 | | 0.169 | | 0.121 |

In Table 1, the human identification system contains data of four persons A, B, C, and D, and the confidence indexes of the face recognition and the speaker recognition are 0.8 and 0.9 respectively. The numeric values of A, B, C, and D represent the scores of the face recognition and the speaker recognition respectively. The numeric values of A*, B*, C*, and D* represent numeric value of the confidence index multiplied by the recognition result.

Both confidence indexes are high, and the score B obtained from the fusion calculation is the highest score, so the human identification result is B. In implementation, each member in the database is recognized to generate a corresponding recognition score.

Figure 3:
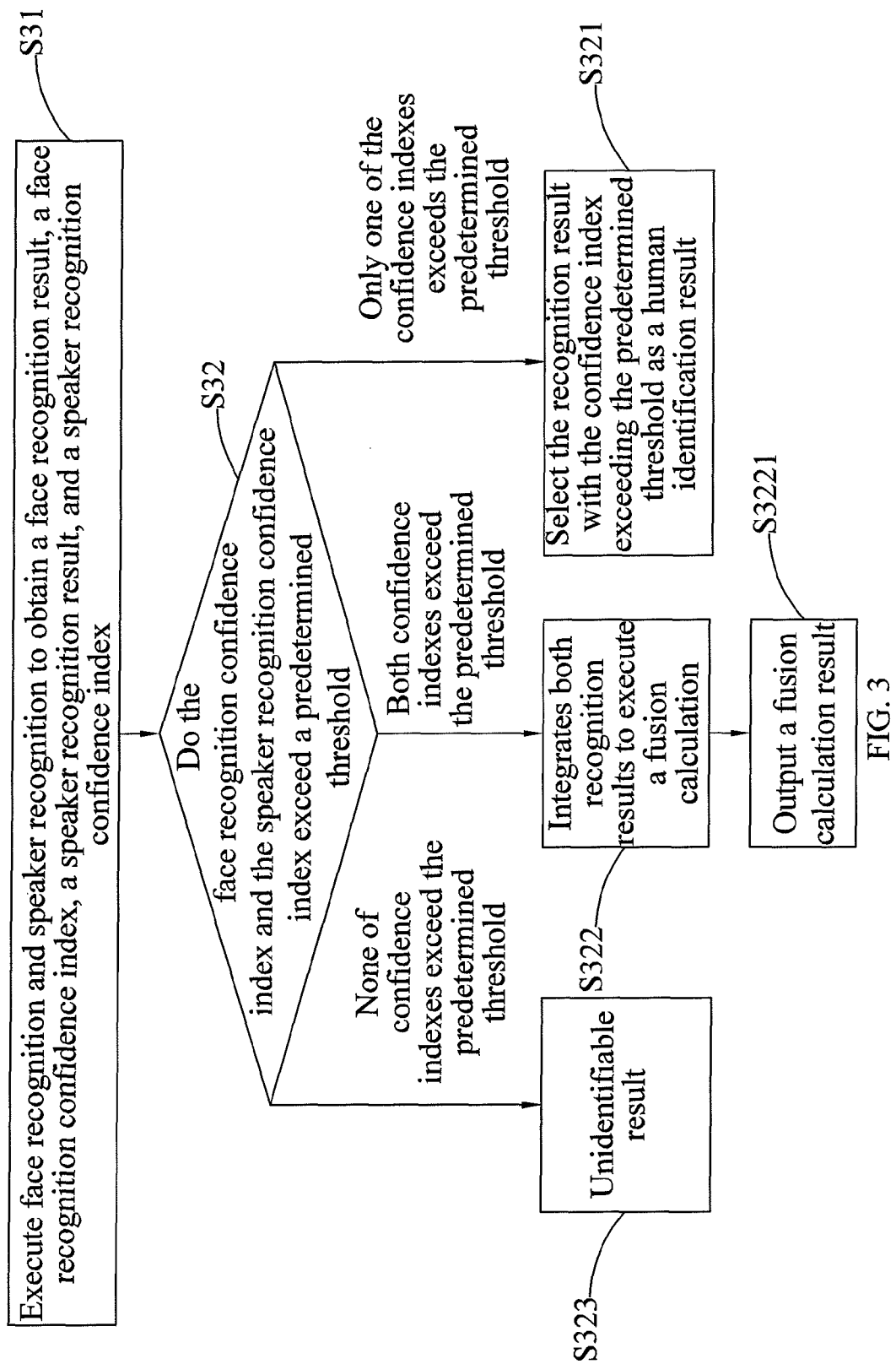
FIG. 3 is a flow chart of the operation of a human identification system by fusion of face recognition and speaker recognition in accordance with the first embodiment of the present invention.

With reference to FIG. 3 for a flow chart of the operation of a human identification system by fusion of face recognition and speaker recognition in accordance with the first embodiment of the present invention, the flow chart is provided for illustrating the human identification method by fusion of recognitions of the present invention, and the method comprises the following steps:

S31: The human identification system executes face recognition and speaker recognition to obtain a face recognition result, a face recognition confidence index, a speaker recognition result, and a speaker recognition confidence index.

S32: The human identification system determines whether the face recognition confidence index and the speaker recognition confidence index exceed a predetermined threshold. If only one of the confidence indexes exceeds the predetermined threshold, go to Step S321; if both confidence indexes exceed the predetermined threshold, go to Step S322; and if none of confidence indexes exceed the predetermined threshold, go to step S323.

S321: The human identification system selects the recognition result with the confidence index exceeding the predetermined threshold as a human identification result.

S322: The human identification system integrates both recognition results to execute a fusion calculation, and then process Step S3221.

S3221: The human identification system outputs a fusion calculation result.

S323: The human identification system determines that the identification is unidentifiable.

Figure 4:
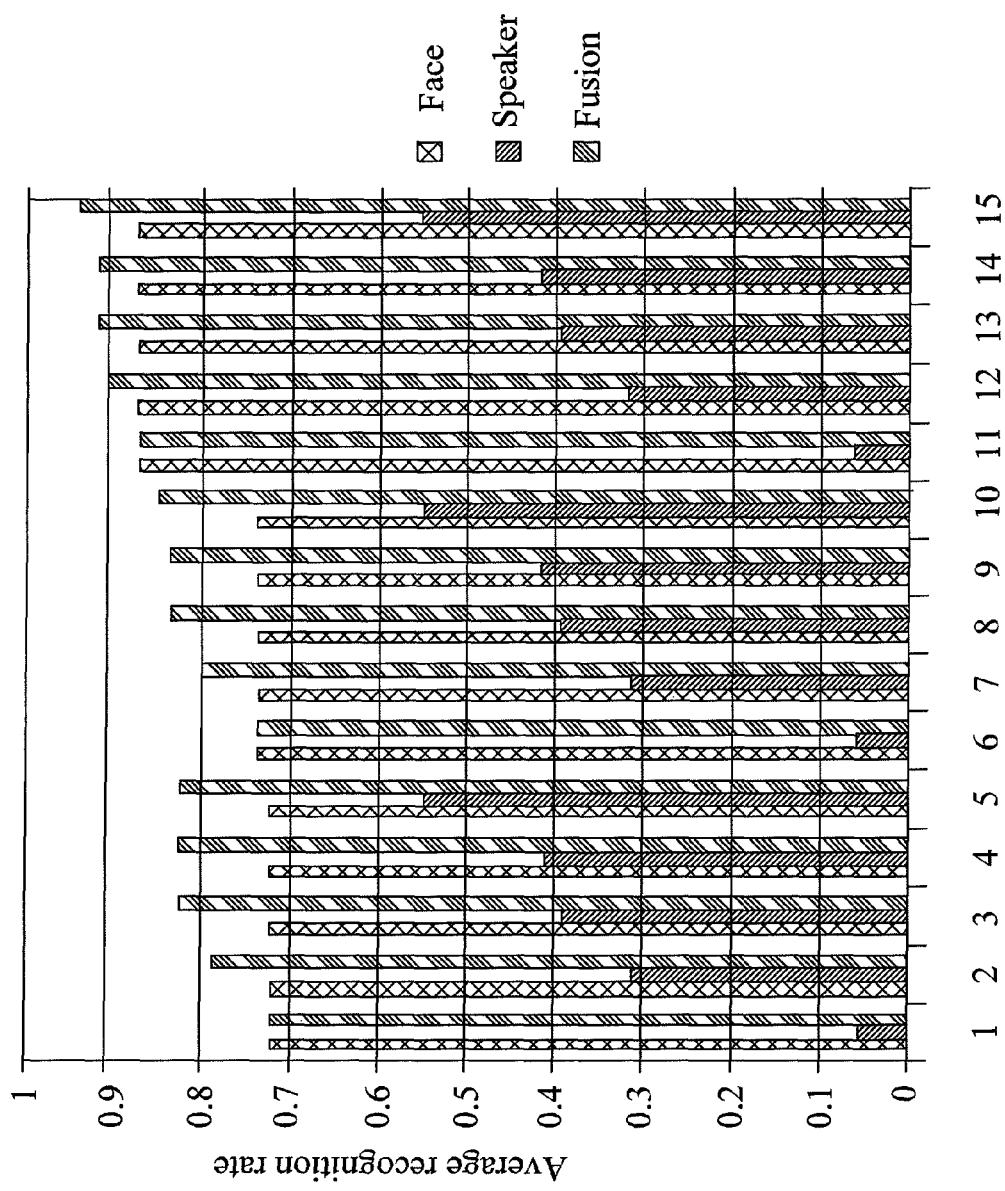
FIG. 4 is a statistical diagram of experiment results of a fusion identification obtained by a human identification system by fusion of face recognition and speaker recognition in accordance with the present invention.

With reference to FIG. 4 for a statistical diagram of experiment results of a fusion identification obtained by a human identification system by fusion of face recognition and speaker recognition in accordance with the present invention, 20 face images and more than 20 seconds of sound data taken respectively from 9 persons are used as data of a training database. Ten face images and ten records of sound exceeding one second taken respectively from 9 persons are used as data of a testing database. The face images used for testing are adjusted with different brightness, and the sound database used for testing are mixed with noises of different intensities to design 15 different environments for the experiments. In FIG. 4, the recognition accuracy of the fusion recognition of the present invention is improved effectively.

Figure 5:
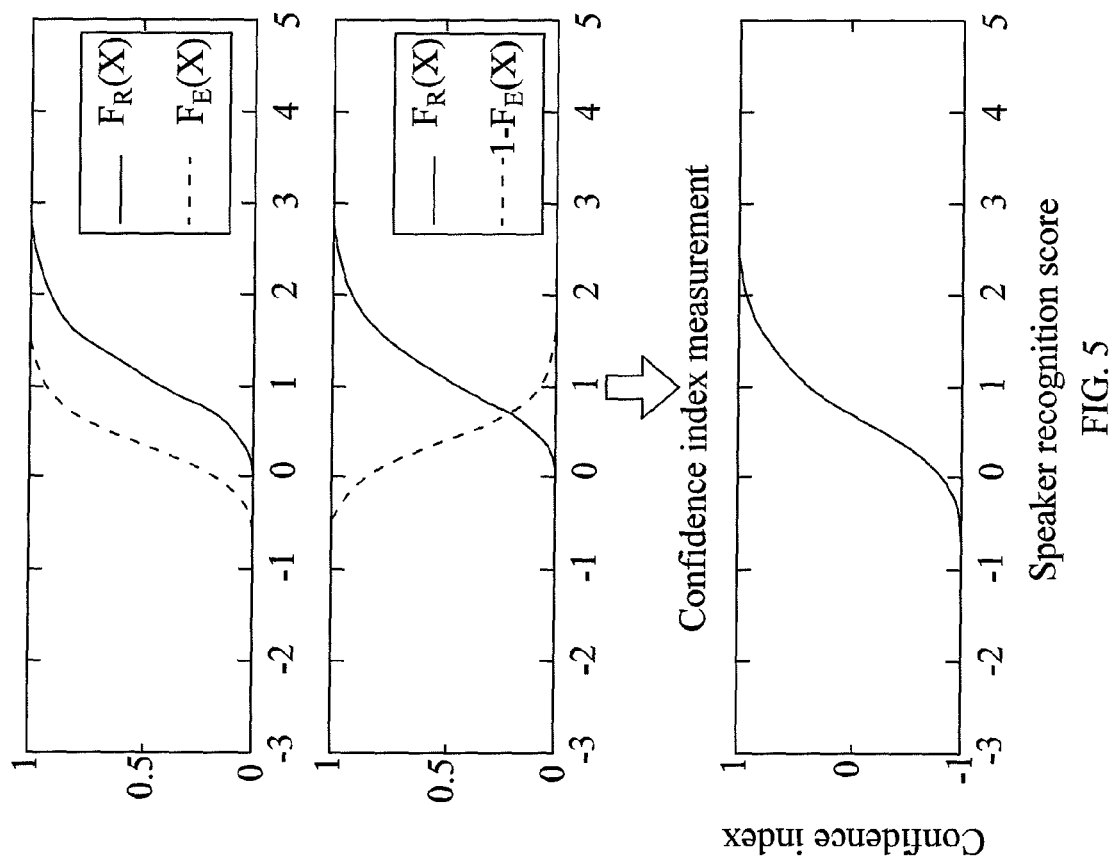
FIG. 5 is a schematic view of the calculation of a speaker recognition confidence index obtained by a human identification system by fusion of face recognition and speaker recognition in accordance with the present invention.

With reference to FIG. 5 for a schematic view of the calculation of a speaker recognition confidence index obtained by a human identification system by fusion of face recognition and speaker recognition in accordance with the present invention, the speaker recognition confidence index calculation of the present invention similarly uses a prior training to obtain a cumulative distribution function $F_R(x)$ of the recognition accuracy score and a cumulative distribution function $F_E(x)$ of the recognition error score through a large number of experiment results. The confidence index curve 251 can be expressed by the following equation:

$$y = F_R(x) - (1 - F_E(x));$$

In implementation, the x-axis of a confidence index curve will be normalized to 0~1 to represent the speaker recognition score 2321, and the y-axis of the confidence index curve will be normalized to 0~1 to represent the speaker recognition confidence index 252.

FIG. 5 shows the curve corresponding to the function above. In a embodiment, three estimation methods can be used to determine the score, and these estimation methods include a universal background model (UBM) normalization, a maximum value normalization and a geometric mean normalization, wherein the UBM has taken the application environment into consideration to build the model, so that it can determine the location of noises effectively, so as to determine the score. The speaker recognition confidence index can also be used for analyzing the difference of the recognition scores. The greater the difference between the highest score and the remaining scores, the higher is the confidence level.

Even though the concept of the human identification method by fusion of face recognition and speaker recognition of the present invention has been described in the section of the human identification system by fusion of face recognition and speaker recognition, yet the following flow chart is provided for illustrating the invention more clearly.

Figure 6:
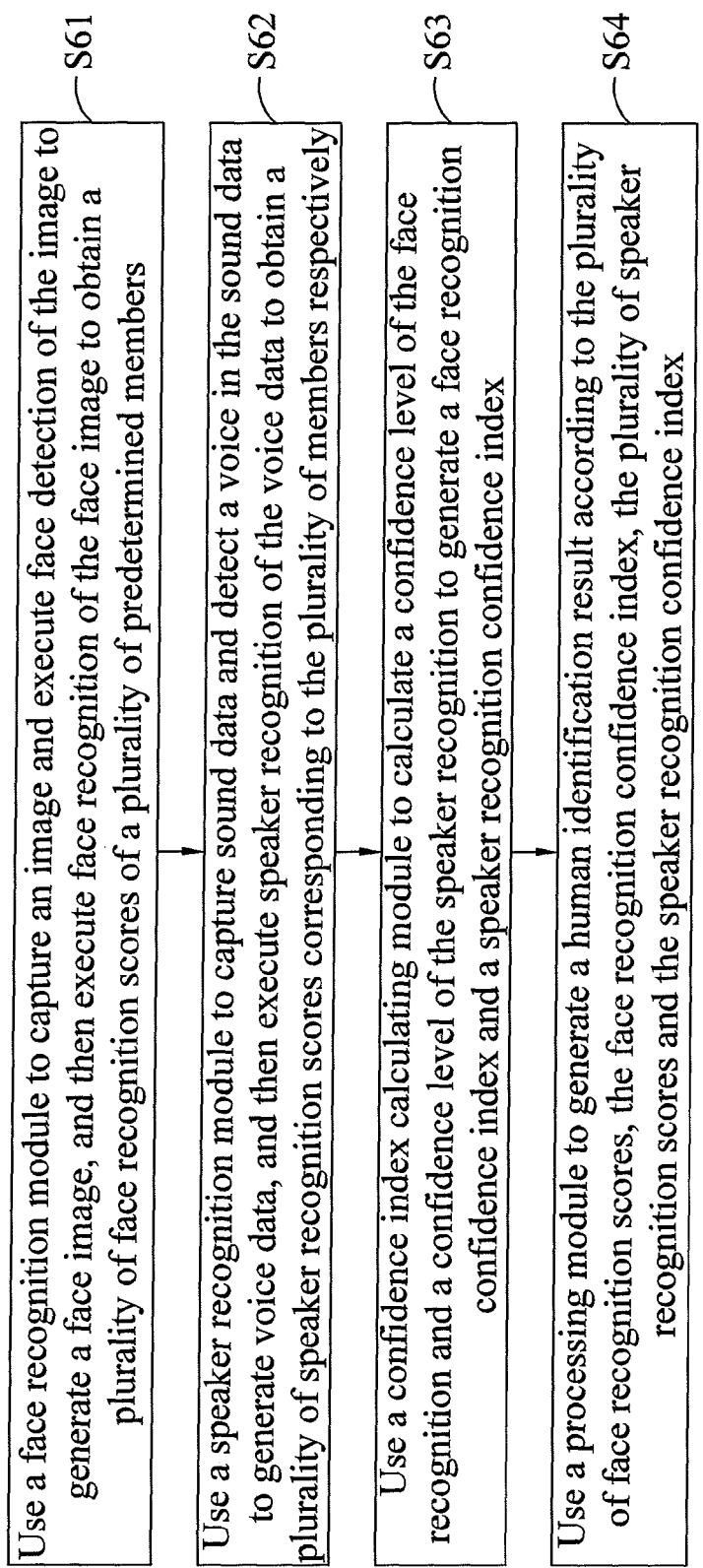
FIG. 6 is a flow chart of a human identification method by fusion of face recognition and speaker recognition in accordance with the present invention.

With reference to FIG. 6 for a flow chart of a human identification method by fusion of face recognition and speaker recognition in accordance with the present invention, the method comprises the following steps:

S61: Use a face recognition module to capture an image and execute face detection of the image to generate a face image, and then execute face recognition of the face image to obtain a plurality of face recognition scores of a plurality of predetermined members.

S62: Use a speaker recognition module to capture sound data and detect a voice in the sound data to generate voice data, and then execute speaker recognition of the voice data to obtain a plurality of speaker recognition scores corresponding to the plurality of members respectively.

S63: Use a confidence index calculating module to calculate a confidence level of the face recognition and a confidence level of the speaker recognition to generate a face recognition confidence index and a speaker recognition confidence index.

S64: Use a processing module to generate a human identification result according to the plurality of face recognition scores, the face recognition confidence index, the plurality of speaker recognition scores and the speaker recognition confidence index.

The details and implementation method of the human identification method by fusion of face recognition and speaker recognition in accordance with the present invention have been described in the section of the human identification system by fusion of face recognition and speaker recognition, and thus will not be repeated.

In summation of the description above, the present invention can use instant information for human identification, and thus featuring instantaneousness. The present invention integrates face recognition and speaker recognition to improve the recognition accuracy effectively. The present invention can evaluate the confidence level of the face recognition and the speaker recognition to provide accurate identifications in complicated environments. Therefore, the invention can achieve the identification effect and improve the recognition accuracy and stability, and even can provide an accurate recognition in a complicated environment to cope with the changing environment of a service robot, or the changing recognition conditions caused by its movements (such as the change of distance, backlight, and shadow). Obviously, the present invention breaks through the prior art and achieves the expected effects, and complies with the patent application, and thus is duly filed for patent application.

Generally, embodiments of the present invention employ various processes involving data stored in or transferred through one or more computers or data processing devices. Embodiments of the present invention also relate to apparatus and systems for performing these operations. The apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will appear from the description given below.

In addition, embodiments of the present invention relate to computer program code, computer readable media or computer program products that include program instructions and/or data (including data structures) for performing various computer-implemented operations. Examples of computer-readable media include, but are not limited to, magnetic media such as hard disks, floppy disks, and magnetic tape; optical media such as CD-ROM disks; magneto-optical media; semiconductor memory devices, and hardware devices that are specially configured to store and perform program instructions, such as read-only memory devices (ROM) and random access memory (RAM). The data and program instructions of this invention may also be embodied on a carrier wave or other transport medium. Examples of program instructions include both machine code, such as produced by a compiler, and files containing higher level code that may be executed by the computer using an interpreter.

While the invention has been described by means of specific embodiments, numerous modifications and variations could be made thereto by those skilled in the art without departing from the scope and spirit of the invention set forth in the claims.

What is claimed is:

1. A human identification system by fusion of face recognition and speaker recognition, comprising:
a face recognition module, arranged for capturing an image, and executing face detection of the image to generate a face image, and then executing face recognition of the face image to obtain a plurality of face recognition scores corresponding to a plurality of predetermined members respectively;
a speaker recognition module, arranged for capturing sound data, and detecting a voice in the sound data to generate voice data, and then executing speaker recognition of the voice data to obtain a plurality of speaker recognition scores corresponding to the plurality of members respectively;
a confidence index calculating module, arranged for calculating a confidence level of the face recognition and a confidence level of the speaker recognition to produce a face recognition confidence index and a speaker recognition confidence index; and
a processing module, arranged for generating a human identification result according to the plurality of face recognition scores, the face recognition confidence index, the plurality of speaker recognition scores and the speaker recognition confidence index;
wherein the processing module generates the human identification result according to the plurality of face recognition score, if the face recognition confidence index exceeds a predetermined threshold and the speaker recognition confidence index does not exceed the predetermined threshold.

2. The human identification system by fusion of face recognition and speaker recognition according to claim 1, wherein the processing module generates the human identification result according to the plurality of speaker recognition scores, if the speaker recognition confidence index exceeds the predetermined threshold and the face recognition confidence index does not exceed the predetermined threshold.

3. The human identification system by fusion of face recognition and speaker recognition according to claim 2, wherein the processing module determines that the human identification result is unidentifiable, if none of the face recognition confidence index and the speaker recognition confidence index exceed the predetermined threshold.

4. The human identification system by fusion of face recognition and speaker recognition according to claim 3, wherein the processing module performs a fusion calculation to generate the human identification result according to the plurality of face recognition scores, the face recognition confidence index, the plurality of speaker recognition scores and the speaker recognition confidence index, if both of the face recognition confidence index and the speaker recognition confidence index exceed the predetermined threshold.

5. The human identification system by fusion of face recognition and speaker recognition according to claim 4, wherein the fusion calculation generates a final face recognition score by multiplying the face recognition score of each of the members by the face recognition confidence index, which is calculated by the confidence index calculating module according to a brightness factor and a recognition score difference factor, through the processing module, generates a final speaker recognition score by multiplying the speaker recognition score of each of the members by the speaker recognition confidence index, adds the final face recognition score and the corresponding final speaker recognition score to generate a human recognition score corresponding to each of the members, and generates the human identification result according to the human recognition score.

6. The human identification system by fusion of face recognition and speaker recognition according to claim 5, wherein the brightness factor satisfies the equation:

$$C1 = \begin{cases} (G^{avg})^2, & G^{avg} < T^{low} \\ (1 - G^{avg})^2, & G^{avg} > T^{high} \\ 1, & T^{low} \leq G^{avg} \leq T^{high}; \end{cases}$$

wherein, C1 is the brightness factor, $T^{high}$ is a maximum threshold of a normal brightness of a gray scale value of the image after being normalized to a range of 0~1, $T^{low}$ is a minimum threshold of a normal brightness of a gray scale value of the image after being normalized to a range of 0~1, and $G^{avg}$ is a average value of the gray scale values of the image after being normalized to a range of 0~1.

7. The human identification system by fusion of face recognition and speaker recognition according to claim 6, wherein the recognition score difference factor satisfies the equation:

$$C2 = \begin{cases} (Y^{1st} - Y^{2nd})/T, & Y^{1st} - Y^{2nd} < T \\ 1, & Y^{1st} - Y^{2nd} \geq T; \end{cases}$$

and the face recognition confidence index satisfies the equation:

$$C = C1 \times C2;$$

wherein, C2 is the recognition score difference factor, T is a difference threshold between the highest score and the second highest score of the plurality of face recognition scores, $Y^{1st}$ is the is highest score of the plurality of face recognition scores, $Y^{2nd}$ the second highest score of the plurality of face recognition scores, and C is the face recognition confidence index.

8. The human identification system by fusion of face recognition and speaker recognition according to claim 7, wherein the confidence index calculating module calculates the speaker recognition confidence index according to a confidence index curve, and the confidence index curve satisfies the equation:

$$y = F_R(x) - (1 - F_E(x));$$

wherein, $F_R(x)$ is a cumulative distribution function of a recognition accuracy score obtained from a prior training, $F_E(x)$ is a cumulative distribution function of a recognition error score obtained from a prior training, the x-axis of a confidence index curve represents the speaker recognition score after being normalized to 0~1, and the y-axis of the confidence index curve represents the speaker recognition confidence index after being normalized to 0~1.

9. A human identification method by fusion of face recognition and speaker recognition, comprising the steps of:
using a face recognition module to capture an image and execute face detection of the image to generate a face image, and then execute face recognition of the face image to obtain a plurality of face recognition scores of a plurality of predetermined members;
using a speaker recognition module to capture sound data and detect a voice in the sound data to generate voice data, and then execute speaker recognition of the voice data to obtain a plurality of speaker recognition scores corresponding to the plurality of members respectively;
using a confidence index calculating module to calculate a confidence level of the face recognition and a confidence level of the speaker recognition to generate a face recognition confidence index and a speaker recognition confidence index; and
using a processing module to generate a human identification result according to the plurality of face recognition scores, the face recognition confidence index, the plurality of speaker recognition scores and the speaker recognition confidence index;
using the processing module to generate the human identification result according to the plurality of face recognition score, if the face recognition confidence index exceeds a predetermined threshold and the speaker recognition confidence index does not exceed the predetermined threshold.

10. The human identification method by fusion of face recognition and speaker recognition according to claim 9, further comprising the step of: using the processing module to generate the human identification result according to the plurality of speaker recognition scores, if the speaker recognition confidence index exceeds the predetermined threshold and the face recognition confidence index does not exceed the predetermined threshold.

11. The human identification method by fusion of face recognition and speaker recognition according to claim 10, further comprising the step of: using the processing module to determine that the human identification result is unidentifiable, if none of the face recognition confidence index and the speaker recognition confidence index exceed the predetermined threshold.

12. The human identification method by fusion of face recognition and speaker recognition according to claim 11, further comprising the step of: using the processing module to perform a fusion calculation to generate the human identification result according to the plurality of face recognition scores, the face recognition confidence index, the plurality of speaker recognition scores and the speaker recognition confidence index, if both of the face recognition confidence index and the speaker recognition confidence index exceed the predetermined threshold.

13. The human identification method by fusion of face recognition and speaker recognition according to claim 12, further comprising the step of: generating a final face recognition score by multiplying the face recognition score of each of the members by the face recognition confidence index through the processing module, generating a final speaker recognition score by multiplying the speaker recognition score of each of the members by the speaker recognition confidence index, adding the final face recognition score and the corresponding final speaker recognition score to generate a human recognition score corresponding to each of the members, and generating the human identification result according to the human recognition score.

14. The human identification method by fusion of face recognition and speaker recognition according to claim 13, further comprising the step of: using the confidence index calculating module to calculate the face recognition confidence index according to a brightness factor and a recognition score difference factor.

15. The human identification method by fusion of face recognition and speaker recognition according to claim 14, wherein the brightness factor satisfies the equation:

$$C1 = \begin{cases} (G^{avg})^2, & G^{avg} < T^{low} \\ (1 - G^{avg})^2, & G^{avg} > T^{high} \\ 1, & T^{low} \leq G^{avg} \leq T^{high}; \end{cases}$$

wherein, C1 is the brightness factor, $T^{high}$ is a maximum threshold of a normal brightness of a gray scale value of the image after being normalized to a range of 0~1, $T^{low}$ is a minimum threshold of a normal brightness of a gray scale value of the image after being normalized to a range of 0~1, and $G^{avg}$ is a average value of the gray scale values of the image after being normalized to a range of 0~1.

16. The human identification method by fusion of face recognition and speaker recognition according to claim 15, wherein the recognition score difference factor satisfies the equation:

$$C2 = \begin{cases} (Y^{1st} - Y^{2nd})/T, & Y^{1st} - Y^{2nd} < T \\ 1, & Y^{1st} - Y^{2nd} \geq T; \end{cases}$$

and the face recognition confidence index satisfies the equation:

$$C = C1 \times C2;$$

wherein, C2 is the recognition score difference factor, T is a difference threshold between the highest score and the second highest score of the plurality of face recognition scores, $Y^{1st}$ is the highest score of the plurality of face recognition scores, $Y^{2nd}$ is the second highest score of the plurality of face recognition scores, and C is the face recognition confidence index.

17. The human identification method by fusion of face recognition and speaker recognition according to claim 16, wherein the confidence index calculating module calculates the speaker recognition confidence index according to a confidence index curve, and the confidence index curve satisfies the equation:

$$y = F_R(x) - (1 - F_E(x));$$

wherein, $F_R(x)$ is a cumulative distribution function of a recognition accuracy score obtained from a prior training, $F_E(x)$ is a cumulative distribution function of a recognition error score obtained from a prior training, the x-axis of a confidence index curve represents the speaker recognition score after being normalized to 0~1, and the y-axis of the confidence index curve represents the speaker recognition confidence index after being normalized to 0~1.

18. A service robot, comprising a power supply and a human identification system by fusion of face recognition and speaker recognition, and the service robot using the human identification system by fusion of face recognition and speaker recognition to identify a user's identity to determine a user's access authority, wherein the human identification system by fusion of face recognition and speaker recognition comprising:

a face recognition module, arranged for capturing an image, and executing face detection of the image to generate a face image, and then executing face recognition of the face image to obtain a plurality of face recognition scores corresponding to a plurality of predetermined members respectively;

a speaker recognition module, arranged for capturing sound data, and detecting a voice in the sound data to generate voice data, and then executing speaker recognition of the voice data to obtain a plurality of speaker recognition scores corresponding to the plurality of members respectively;

a confidence index calculating module, arranged for calculating a confidence level of the face recognition and a confidence level of the speaker recognition to produce a face recognition confidence index and a speaker recognition confidence index; and a processing module, arranged for generating a human identification result according to the plurality of face recognition scores, the face recognition confidence index, the plurality of speaker recognition scores and the speaker recognition confidence index;

wherein the processing module generates the human identification result according to the plurality of face recognition score, if the face recognition confidence index exceeds a predetermined threshold and the speaker recognition confidence index does not exceed the predetermined threshold.

* * * * *